United States Patent
Muth

(10) Patent No.: US 7,546,474 B2
(45) Date of Patent: Jun. 9, 2009

(54) BUS SYSTEM WITH LINE CONTROL DURING THE LOW-POWER PHASE

(75) Inventor: Matthias Muth, Stelle (DE)

(73) Assignee: NXP B.V., Eindhoven (NL)

(*) Notice: Subject to any disclaimer, the term of this patent is extended or adjusted under 35 U.S.C. 154(b) by 1356 days.

(21) Appl. No.: 10/221,718

(22) PCT Filed: Dec. 21, 2001

(86) PCT No.: PCT/IB01/02698

§ 371 (c)(1),
(2), (4) Date: Sep. 13, 2002

(87) PCT Pub. No.: WO02/060125

PCT Pub. Date: Aug. 1, 2002

(65) Prior Publication Data
US 2004/0012432 A1    Jan. 22, 2004

(30) Foreign Application Priority Data
Jan. 25, 2001  (DE) ............................. 101 03 323

(51) Int. Cl.
*G06F 1/32*   (2006.01)
*G06F 11/00*  (2006.01)

(52) U.S. Cl. ..................... 713/320; 713/323; 714/55

(58) Field of Classification Search ......... 713/300–324;
714/51, 55
See application file for complete search history.

(56) References Cited

U.S. PATENT DOCUMENTS

| | | | | | |
|---|---|---|---|---|---|
| 5,563,799 | A | * | 10/1996 | Brehmer et al. | 702/186 |
| 5,781,585 | A | * | 7/1998 | Dorner et al. | 375/224 |
| 5,994,931 | A | * | 11/1999 | Heinen et al. | 327/141 |
| 6,438,462 | B1 | * | 8/2002 | Hanf et al. | 700/297 |
| 2002/0046355 | A1 | * | 4/2002 | Takeuchi | 713/320 |

FOREIGN PATENT DOCUMENTS

| | | | | |
|---|---|---|---|---|
| DE | 195 09 133 | A | * | 10/1995 |
| DE | 196 37 312 | A | * | 3/1998 |
| WO | WO 99 46888 | A | * | 9/1999 |

* cited by examiner

*Primary Examiner*—Dennis M Butler

(57) ABSTRACT

In a bus system with a low-power phase, in which bus members are in a state of reduced current consumption and leave this state when the bus lines (1, 2) are active for a longer period than a predetermined time interval, the function of the bus in the low-power phase is monitored in that a first participant (3) cyclically transmits at least one pulse on the bus during the low-power phase, which pulse has a duration that is shorter than the predetermined time interval and is received and evaluated at least by a second bus member (4) for the purpose of monitoring the bus lines (1, 2).

5 Claims, 1 Drawing Sheet

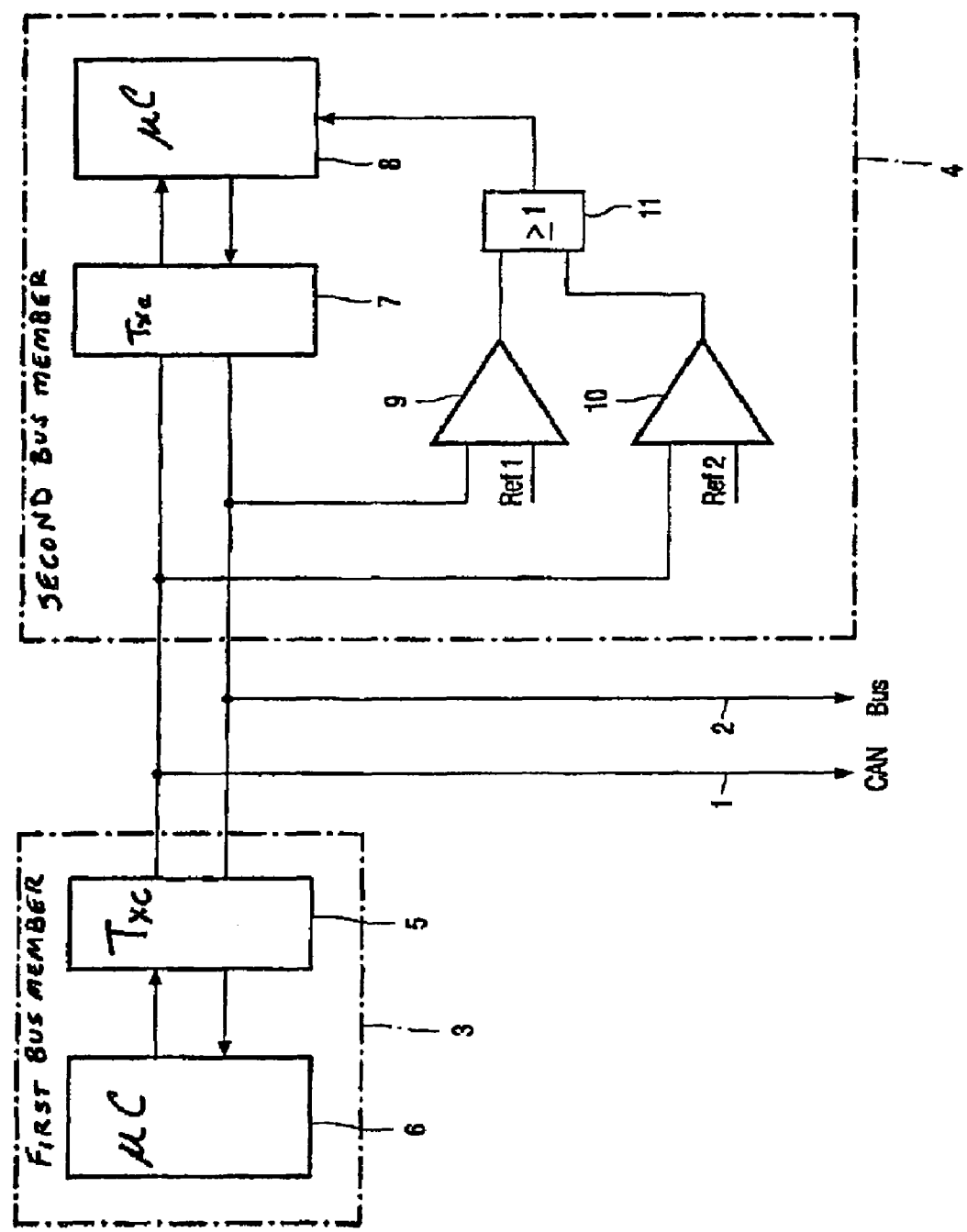

BUS SYSTEM WITH LINE CONTROL DURING THE LOW-POWER PHASE

The invention relates to a bus system with a low-power phase, in which bus members are in a state of reduced current consumption and leave this state when the bus lines are active for a longer period than a predetermined time interval. Such bus systems which may be, for example, a CAN bus, are known. Low-power phases are provided for the purpose of reducing the current consumption of the bus members during inactive periods of time. This is particularly useful in mobile vehicles having a limited energy supply.

In known solutions, the bus members remain in the low-power phase until there is active transmission on the bus during a time interval that exceeds a predetermined time interval, which is a kind of wake-up time. When this predetermined time of the active state of the bus is exceeded, the bus members leave the low-power phase and change over to the operating state in which they can transmit or receive data to or from the bus. Such an implementation of the low-power phase is known, for example, from the transceivers, types PCA 82 C 252, TJA 1053 and TJA 1054 of Philips.

It is often desirable, also during such a low-power phase, to monitor the state of the bus and to check particularly whether the bus further operates correctly or whether the bus lines are interrupted. This is not possible in the state of the art.

It is therefore an object of the invention to implement the above-mentioned bus system in such a way that the function of the bus can also be monitored during the low-power phase.

For a bus system of the type described in the opening paragraph, this object is solved in that a first participant cyclically transmits at least one pulse on the bus during a low-power phase, which pulse has a duration that is shorter than the predetermined time interval and is received and evaluated at least by a second bus member for the purpose of monitoring the bus lines.

Monitoring the state of the bus will thus also become possible during a low-power phase in that a participant supplies at least one pulse during such a low-power phase to the data bus in a cyclically repetitive manner, in which the duration of this pulse or these pulses should be chosen to be such that it is shorter than the predetermined time interval. As a result, the "normal" bus members are not woken up by these pulses because these pulses have a shorter duration than the predetermined time interval, while the bus members do not leave the low-power phase until after one or more pulses having a duration that exceeds this time interval appear on the bus.

At least one further bus member is provided, which monitors the bus lines also during a low-power phase. This monitoring may be performed in a cyclic rhythm. If this second bus member cyclically receives this pulse during a low-power phase, this means that the bus functions flawlessly. If this pulse is no longer received by the second bus member, there is a bus failure.

To check the function of the bus during a low-power phase, only the first and the second bus member must be woken up cyclically so as to supply or receive the pulse. Other bus members may remain in the low-power phase. Nevertheless, a cyclic testing of the function of the bus is possible in this way, also in the low-power phase.

In an embodiment of the invention as defined in claim 2, the second bus member may advantageously supply an alarm signal when it finds out during a low-power phase that the pulse which is sent by the first bus member and normally appears cyclically fails to occur, which alarm signal signalizes to, for example, the bus members involved that the function of the bus is disturbed. This is suitable for use in, for example, motor vehicles in which the bus system is tested simultaneously via alarm installations that are cross-linked via this bus system and in which the alarm is also triggered when the bus system is disturbed, for example, due to manipulation of the bus lines.

To obtain a saving of energy also for the first bus member transmitting the pulse during the low-power phase, a further embodiment of the invention as defined in claim 3 ensures that the bus member is normally in the low-power phase and, for transmitting the cyclic pulse, is woken up in this cycle by a watchdog circuit.

In accordance with a further embodiment of the invention as defined in claim 6, this also holds for the second bus member which evaluates the cyclically transmitted pulse and is advantageously woken up cyclically by means of a watchdog circuit for evaluating the pulse. Here again, an essential part of the advantages of energy saving of the low-power phase is preserved.

These and other aspects of the invention are apparent from and will be elucidated with reference to the embodiments described hereinafter.

In the drawing, the FIGURE is a block diagram of a CAN bus, with a first participant 3 and a second participant 4.

Further participants (not shown) are connected to the CAN bus which comprises lines 1 and 2. These participants, likewise as the first participant 3 and the second participant 4, transmit their data on the two lines 1 and 2 of the CAN bus differentially, i.e. a bit to be transmitted is dominantly transmitted on the bus in such a way that the potential of, for example, line 1 is increased and that of line 2 is decreased. The mode of operation and the protocol of such a CAN bus are laid down in ISO specification 11898.

Known solutions for saving energy provide a low-power phase to which the bus members can be set. The bus members wake up from this low-power phase only when a dominant signal appears on the bus lines 1 and 2 for a period of time which is longer than a predetermined time interval.

When the bus members are in the low-power phase, the prior-art solutions do not provide a possibility of testing the function of the bus and the bus lines 1 and 2 because all bus members are inactive.

However, for given applications in motor vehicles, it is desirable to permanently monitor the bus function. This is desirable, for example, for alarm installations in motor vehicles which are cross-linked through this bus.

According to the invention, a first bus member 3 is provided, which transmits at least one pulse during the low-power phases in a cyclically repetitive rhythm and with a duration which is shorter than the predetermined time interval.

Furthermore, at least a second bus member 4 is provided, which tests in the same cyclically repetitive rhythm whether it receives this pulse transmitted by the first bus member 3. If this is the case, the bus operates flawlessly. However, if the bus member 4 does not receive this pulse, the CAN bus exhibits a function failure and the second bus member 4 can trigger an alarm accordingly.

The function of the first bus member 3 and the second bus member 4 will hereinafter be elucidated with reference to the block diagram.

The block diagram shows that the first bus member 3 comprises a transceiver 5 which establishes the connection with the lines 1 and 2 of the CAN bus and can receive or transmit data from and to this bus.

A microcontroller 6 having a watchdog function is coupled to the transceiver 5. The microcontroller 6 controls the transceiver and treats, for example, the bus protocol of the CAN bus. According to the invention, however, a watchdog function is also integrated in the microcontroller 6, in which watchdog function the first bus member 3 is "woken up" in cyclic intervals when the first bus member 3 and the CAN bus are in a low-power phase, and which causes the transceiver 5 to transmit a pulse on the lines 1 and 2 of the CAN bus. It should be noted that this pulse must have a shorter duration than the predetermined time interval in which the bus members in the low-power phase are "woken up" in the dominant bus so that they can leave the low-power phase.

The watchdog circuit in the microcontroller 6 thus ensures that a pulse is dominantly transmitted on the lines 1 and 2 of the CAN bus in a cyclically repetitive manner by means of the transceiver, which pulse has such a duration that the other bus members are not woken up. This particularly applies to further bus members (not shown) which do not monitor this pulse.

According to the invention, the bus system comprises the second bus member 4 which comprises a transceiver 7 coupled to the two lines 1 and 2 of the CAN bus. The transceiver 7 is controlled by a microcontroller 8 in which a watchdog function is also integrated.

The second bus member 4 further comprises a first comparator 9 which compares the potential of the second bus line 2 with a first reference potential Ref1. A second comparator 10 compares the potential of the first bus line 1 with a second reference potential Ref2.

When a bit is dominantly transmitted on the two data bus lines 1 and 2, the potential of the bus line 1 exceeds the second reference potential Ref2 during this period, and the second comparator 10 supplies a corresponding output signal. In the case of a bit dominantly transmitted on the bus line 2, and due to the potential decrease of this line, the comparator 9 supplies a signal in a corresponding manner when the potential of this line falls below the first reference potential Ref1.

In the case of a normal function of the data bus, both comparators 9 and 10 should thus supply a signal as long as a bit is dominantly transmitted on the data bus. For the error evaluation according to the invention, the two output signals of the comparators 9 and 10 are combined by means of an OR-gate 11 whose output signal is applied to the microcontroller 8 of the second bus member 4.

The microcontroller 8 evaluates the output signal of the OR-gate 11 in the cycle described above, in which the first bus member 3 transmits a pulse on the bus lines 1 and 2 in a low-power phase. It is in this cycle that both the comparator 9 and the comparator 10 should supply an output signal in the case of a flawless function of the CAN bus, which output signal is applied via the OR-gate 11 to the microcontroller 8 and is evaluated by this microcontroller.

In the embodiment, the combination of the two output signals of the comparators 9 and 10 of the OR-gate 11 is based on the assumption that it is sufficient when one of the bus lines 1 or 2 of the CAN bus performs flawlessly because a bus function is still ensured in this case. Consequently, the microcontroller 8 will perform the evaluation in such a way that the bus is assumed to function flawlessly when already one of the two comparators 9 or 10 supplies an output signal.

However, if the microcontroller 8 determines, in the cycle described above, that it does not receive a signal from the OR-gate 11, neither the bus line 1 nor the bus line 2 has received the pulse transmitted by the first bus member 3. Consequently, there is a bus disturbance. In this case, the microcontroller 8 of the second bus member 4 may advantageously trigger an alarm.

By means of the bus system according to the invention, the function of the bus and the bus lines 1 and 2 is thus monitored also in a low-power phase. To this end, only the first bus member 3 and the second bus member 4 must cyclically leave the low-power phase for a short period of time. All other bus members may remain in the low-power phase also during these cyclic test phases.

In spite of the possible monitoring of the function of the bus in its low-power phase, most bus members do not need to be "woken up". Also the bus members 3 and 4 can stay in their low-power phase for a long time, dependent on their application, and should only be cyclically woken up for the test phase. The cycle time results from the required speed of reaction to cable manipulations.

The invention claimed is:

1. A bus system with a low-power phase, in which bus members are in a state of reduced current consumption and leave this state when bus lines are active for a longer period than a predetermined time interval, in which a first bus member cyclically transmits at least one pulse on the bus during a low-power phase, which pulse has a duration that is shorter than the predetermined time interval and is received and evaluated at least by a second bus member for the purpose of monitoring the bus lines, wherein the second bus member evaluates the pulse cyclically transmitted on the bus during a low-power phase cyclically evaluates bus lines via two comparators and a watchdog circuit, and supplies an alarm signal when the pulse cyclically transmitted on the bus during a low-power phase does not appear on the bus lines.

2. A bus system as claimed in claim 1, wherein the second bus member supplies an alarm signal when it does not receive the pulse at least during one cycle.

3. A bus system as claimed in claim 1, wherein for transmitting the pulse, the first bus member transmitting the pulse during a low-power phase is cyclically awakened by the watchdog circuit.

4. A bus system as claimed in claim 1, wherein the bus system is a CAN bus.

5. A bus system as claimed in claim 4, wherein the pulse cyclically transmitted on the bus during a low-power phase is transmitted on both bus lines.

* * * * *